Sept. 15, 1959  J. W. MENHALL  2,904,154
CLOCKLESS PARKING METER

Filed Aug. 17, 1953  4 Sheets-Sheet 3

INVENTOR.
J. W. Menhall
BY
Robb & Robb
attorneys

Sept. 15, 1959　　J. W. MENHALL　　2,904,154
CLOCKLESS PARKING METER
Filed Aug. 17, 1953　　4 Sheets-Sheet 4
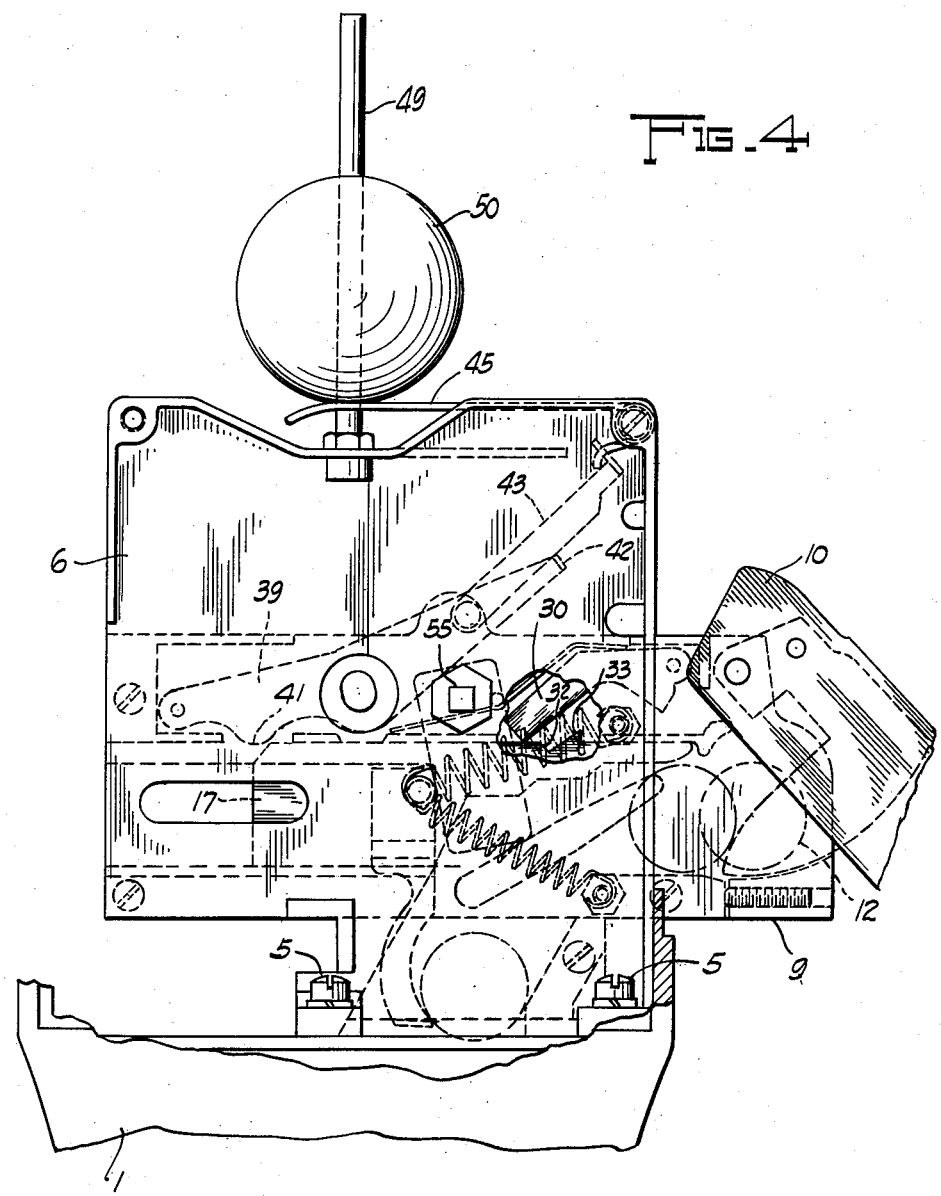
INVENTOR.
J. W. Menhall
BY Robb & Robb
attorneys

United States Patent Office 2,904,154
Patented Sept. 15, 1959

2,904,154

CLOCKLESS PARKING METER

James W. Menhall, Benton, Ill.

Application August 17, 1953, Serial No. 374,574

4 Claims. (Cl. 194—74)

This invention relates to parking meters and primarily to meters which are manually re-settable at the end of a parking period, to indicate the expiration of such period.

In general presently used parking meters include two types, both of which avail of clock works. The first type includes an arrangement for automatically beginning the operation of the mechanism and the second type requires manual manipulation of a lever or the like to set the clock works into operation, both of the devices being coin controlled for such operation.

In the above type, a signal is automatically brought into view at the end of a period determined by pre-setting of the clock works and other mechanisms associated therewith.

The present invention provides a vastly more simple parking meter, which is manually controlled, at both the beginning and end of the period, and thus enables any period to be provided without changing the mechanism in any way.

Further the meter hereof is thus in reality a third type which is particularly suitable for use in vehicle parking lots or in areas which have large numbers of parking meters within relatively short distances.

With the foregoing in mind it is a principal object of this invention to provide a parking meter which is extremely simple in construction, operation, and maintenance, involving few parts, but effectively indicating and controlling parking periods.

It is a further object to provide a parking meter which includes a signal normally visible to show violation, is made substantially invisible upon insertion of a coin and manipulation of a lever by hand, the end of the period being indicated by manual operation of the signal so as to again effect visibility thereof.

A still further object of the invention is to provide a parking meter in which the meter is manually settable at the beginning of the parking period, manually operated to indicate termination of the period, and common operating instrumentalities are provided to be acted upon by such manipulation.

Another object of the invention is to provide a novel arrangement of the parts, wherein the common operating instrumentalities include a reciprocable member adapted to be actuated by coin controlled means for causing the signal to be moved out of visible position, and manual means for operating said member to move the signal into signaling position at any time.

Other and further objects of the invention will be understood from the specification appended hereto and shown in the drawings wherein:

Figure 4 is a rear view of the parking meter, illustrating the parts thereof in different positions, certain of the parts being omitted.

Figure 1:
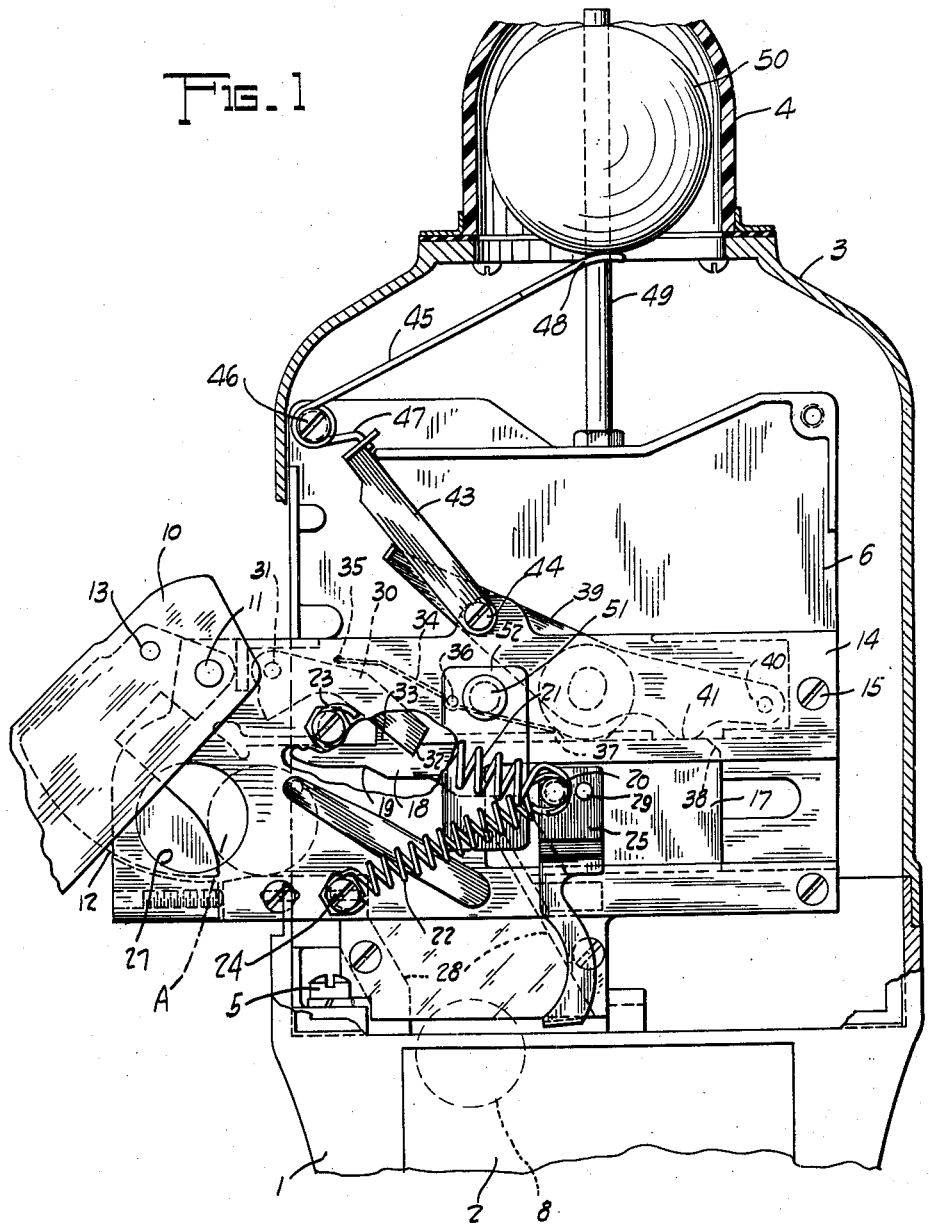
Figure 1 is a front view of the meter, part of the same being shown in section and certain portions being broken away to illustrate certain features.
Figure 3:
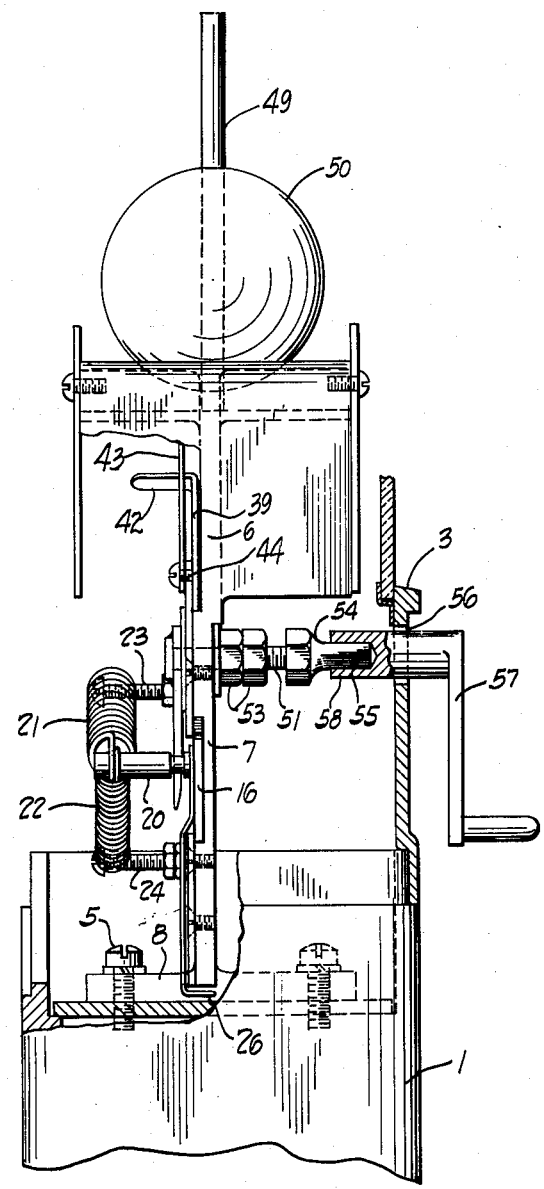
Figure 3 is an end view of the meter showing the relationship between the common operating instrumentalities and the manual means for causing the signal to indicate the termination of the parking period.

Referring to the drawings, and initially to Figures 1 and 3, the parking meter of this invention is shown as comprising a base structure generally indicated at 1, within which is located the coin receiving box 2. While the base 1 is not shown as being formed so as to mount upon the usual stanchion, it will be understood that such is the intention in accordance with usual practice.

Above the base member 1 and suitably connected therewith is the casing 3, having at its upper portion the transparent section 4 for purposes which will be set forth hereinafter.

Within the casing 3 and suitably fastened thereto as by means of the screws 5, is the body or mounting member generally denoted 6. The member 6 as will be seen from Figure 3 includes a substantially centrally located vertical plate-like member 7, terminating at the bottom in the flanges 8 in which the screws 5 are seated and whereby the connection to the base 1 is effected.

Located about centrally of the body 6, is the mechanism next to be described, which includes the operating parts for manipulation and actuation of the signal.

The above parts include an outwardly extending portion of the body 6, denoted 9, the same being provided near the upper edge thereof with a suitable opening and upon which a handle 10 is pivotally mounted at 11. The handle 10 is hollow at its upper portion and includes therewithin a coin pusher or cam 12, which cam 12 is fastened at the pivot 11 and in addition connected to the handle by means of a pin 13 so as to be movable with the handle as will be subsequently set forth.

Mounted over the extension 9, and extending from left to right over the central portion of the body 6, is a plate 14, suitably fastened to the body 6 by means of the screws 15, and providing a space between the body 6 and the plate 14 in the form of a recess. Within the recess so formed, and indicated at 16 in Figure 3, is a slide member 17 which includes a substantially rectangular portion and an extension at the left end thereof in the form of a finger denoted 18, including cam means 19 thereon.

The slide or actuator 17, further includes a stud 20 thereon, extending outwardly from the slide as shown in Figure 3, which stud 20 is engaged with the springs denoted 21 and 22. The spring 21 is engaged at its left end as shown in the drawing with a bolt 23 suitably mounted in the body 6, and the spring 22 engages a similar bolt 24 likewise carried by the body. The springs 21 and 22 will therefore normally compel movement of the slide 17 toward the left as viewed in Figure 1. Likewise connected to the slide 17 and extending downwardly therefrom is the coin supporting arm 25, the same being equipped at its lower end with an inwardly turned part 26 as shown in Figure 3, for purposes which will be hereinafter set forth.

The extension 9, in conjunction with the plate 14, forms between the same and extending inwardly toward the center of the body 6, a coin receiving passageway, there being provided a coin receiving opening 27 in the outer end of the plate 14. The coin receiving passageway is in alignment with the slide 17 as will be subsequently explained, and insertion of a coin within the opening 27, may be subsequently accompanied by manipulation of the handle 10 so as to cause the coin to move inwardly within the coin receiving slot, and subsequently downwardly through a passage indicated in dotted lines in Figure 1 and denoted 28. When the coin has reached the lower portion of the passage 28, as shown in Figure 4 the same is supported therein in conjunction with the supporting arm 25 and a wall of the passageway 28 until released during operation of the mechanism. It should be noted that the coin supporting arm 25 is fastened to the slide 17 by means of a rivet 29 so as to be positively fixed for movement therewith.

In alignement with the slide or actuator 17 above mentioned, and maintained in position with respect to the body 6 by means of the plate 14, is the latch indicated at 30, being pivotally mounted at 31 on the extension 9 of the body. The latch 30 is adapted to co-act with a notch 32 formed in the upper edge of the slide 17, and so positioned as to maintain the slide in the location shown in Figure 1 under certain conditions. In addition the upper edge of the slide 17 is formed with an upstanding abutment member 33, so as to in effect be a continuation of the notch 32. It will be understood that in the condition of the parts as shown in Figure 1, namely the latch 30 and the slide 17, the latch is maintained in the notch by means of a spring 34, bearing at one end 35 against the notch, adjacent its middle being mounted so as to bear against a stud 36, and at its other end engaging a protuberance or ledge-like formation 37, the tension in the spring 34 causing maintenance of the latch 30 in the notch 32.

At the right hand end and the upper corner of the slide 17, the same is provided with an additional cam portion 38, which is intended to engage an operating arm 39, the said operating arm 39 being in alignment with the slide 17 and being pivoted at one end at 40. The operating arm 39 is further provided with a protuberance 41 for engagement with the cam portion 38 of the slide 17, when the slide 17 moves from left to right, to thereby cause the arm 39 to swing in a clockwise direction. In the movement of the arm 39, the same being equipped at its outer end with an offstanding part 42, the said arm will engage with a lever 43, the said lever 43 being pivotally mounted on the plate 14 at 44. At the outer end of the lever 43, the same is intended to engage with a signal lifting member 45, said member 45 being formed of wire or similar material and adapted to pivot around bolt 46. The member 45 is provided with an extension 47 engaging the outer end of the part 43, and at its extremity 48, surrounds a post 49 upon which is mounted a signal 50, so that the portion 48 abuts the lower portion of the signal 50.

The signal 50 may preferably be in the form of a ball or the like, and suitably colored so as to be readily visible through the transparent section 4 of the casing 3 during operation of the device in the manner to be hereinafter set forth.

Figure 2:
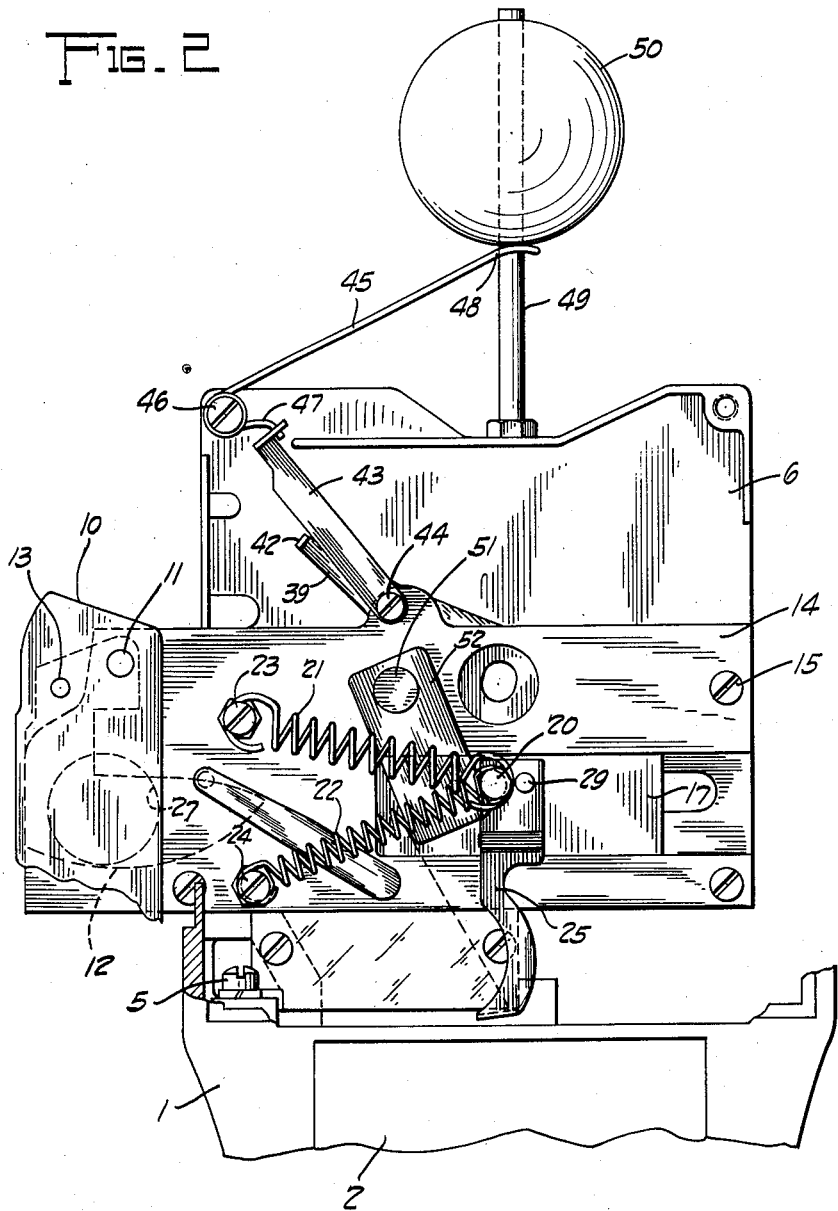
Figure 2 is a view similar to Fig. 1 showing the parts in one of the positions to be described, certain parts being omitted.

Turning now to a consideration of Figure 2, there is shown a part of the manually manipulable portion of the device, which is availed of to reset the device to show a violation as existing. This includes a shaft member as shown in Figure 3 and denoted 51, which extends through the body 6, toward the front thereof as shown in Figure 2, the forward end of the shaft 51 being provided with a rectangular shaped operating arm 52, said arm 52 being fixedly secured to the shaft 51. The shaft 51 as shown is threaded and provided with suitable lock nuts 53 thereon so as to assist in maintaining the shaft in alignment for operation as will be understood hereinafter.

At the outer end of the shaft 51, toward the right as viewed in Figure 3, there is shown an extension member 54, having formed on its extremity a square shank 55. The shank 55 is located so as to be opposite a suitable opening 56 in the casing 3, for manipulation. A suitable key 57 is provided having a portion 58 adapted to be received on the shank 55, for operation of the device.

With the foregoing general description of the parts involved in this parking meter invention, and their relationship having been set forth, the operation of the parking meter will now be explained.

Initially it will be assumed that the parts are in the condition as shown in Figure 1, the handle 10 being normally substantially vertical alongside the casing and base member 1, and thereafter the handle member is caused to pivot outwardly in a clockwise direction around the pivot 11 so as to permit the coin to be inserted within the opening 27. Subsequently counter-clockwise rotation of the handle 10 will cause the coin to be engaged by the cam member 12, and to move toward the right within the mechanism, subsequently coming into engagement with the extension 18 upon which the cam portion 19 of the slide 17 is formed. Further movement of the handle, the coin being shown in dotted lines at A, will cause movement of the slide 17 toward the right. When the coin reaches the point where it is adapted to drop downwardly into the passageway 28, it will be apparent that the lug or abutment member 33 will have raised the latch 30 out of engagement with the notch 32. As the coin slips downwardly into the interior of the passageway 28, the springs 22 and 21 will come into action, and by reason of their having been previously expanded during the movement to the rightward of the slide 17, will cause a sudden reverse movement of the said slide toward the left. The springs are so arranged as to cause this movement to take place rapidly enough prior to the time within which the latch 30 could again move downwardly under the compulsion of the spring 34, so that the notch 32 escapes such engagement, and moves toward the left into the position of the parts as shown in Figure 4.

At such time as the slide 17 has moved into the position as shown in Figure 4, it being understood that the coin is now supported by the arm 25 as shown in said figure within the passageway 28, the protuberance 41 on the operating arm 39 will have moved downwardly sufficiently, to permit the lever 43 to likewise move in a counter-clockwise direction, a similar downward movement of the end 48 of the lift arm 45 taking place. It will be apparent that the signal 50 will thereby move downwardly into position so as to be substantially completely obscured within the casing 3, and thus the meter is set for authorized operation.

Assuming that the meter of the invention herein, has been installed in a parking lot for example, and it is desired to permit a patron to avail of the parking space for a period of four hours for example, at the end of that time, the attendant will insert the key 57 into the opening 56, and engage the shank 55 and thereby be able to rotate the arm 52 into the position as shown in Figure 2. Such movement of the arm 52 will engage the post 20, and compel the slide 17 to be moved to the position as shown in Figure 1. The movement of the slide by manipulation of the key 57, will cause the protuberance 41 on the arm 39, to move in a clockwise direction, and likewise the lever 43 to thereby compel the lift arm 45 to again raise the signal 50 into visible position within the transparent section 4 of the casing 3. This action will result in a visible signal being evident to the person who has parked his car in the particular place, and indicate that another coin must be deposited to acquire additional time in that particular location.

It will also be understood that parking meters of the above description may be installed upon the streets preferably in locations where it is feasible to grant relatively long periods of parking time, in order to enable an attendant or suitable authorized person to operate the signal by manual means to raise the same into view and show a violation of the parking time.

It will be apparent from the foregoing description, that an initial operation of a coin controlled portion of the device is necessary to inaugurate a parking period, by causing the signal to become relatively invisible, and that thereafter manual manipulation is required on the part of an authorized person to raise the signal into a violation position so-called.

It will also be understood that during subsequent operations of the slide 17, the coins previously supported in the position as shown in Figure 4, will be permitted to drop downwardly as indicated in dotted lines at B in Figure 1, into a suitable coin receptacle 2 within the base 1 of the meter.

It is to be understood that my meter mechanism may be employed with or without the use of the guide post 49 for the signal 50. In other words, the actuating member 45 will operate the signal 50 properly even though the post 49 is dispensed with.

I claim:

1. In a clockless parking meter, in combination, a casing, a signal on the casing shiftable to signalling and non-signalling positions, mechanism in the casing for actuating the signal including an actuating slide provided with a cam, members in the casing operable by said cam to effect said shifting of the signal, a locking member coacting with the slide to hold same in a position wherein the slide maintains the signal in signalling position, a manually operable coin controlled member cooperable with a coin impinged between same and said slide for moving the slide, spring means connected to the slide for actuating same to release it from the said locking means for causing the signal to assume non-signalling position when the coin controlled manual member is actuated, and separate selectively operable manual means in the casing cooperable with the slide to restore same to its position in which it is locked by the locking member.

2. In a parking meter of the class described, in combination, a casing, a signal movable thereon to signalling and non-signalling positions, mechanism in the casing for actuating said signal, including an actuator operable to move the signal to said positions, said signal actuating mechanism also comprising a locking member to hold the actuator in a position maintaining the signal in its signalling position, coin controlled manual means on the casing cooperatig with the actuator to move the signal to non-signalling position and releasable upon operation of the coin controlled manual means when coacting with a coin in the meter to enable the signal to shift to non-signalling position, and other manual means cooperable with the actuator to shift the signal into signalling position, said other manual means comprising a key insertable in the meter casing, and a rocker arm in the casing shiftable by the key to move the actuator to restore the signal to signalling position.

3. In a parking meter of the class described, in combination, a casing, a signal movable thereon to signalling and non-signalling positions, a mechanism in the casing for actuating said signal, including an actuator operable to move the signal to said positions, coin controlled manual means on the casing cooperating with the actuator to move signal to non-signalling position, said actuator is a slide mounted in the casing to reciprocate and movable by a coin engaged by the coin controlled manual means, and the other manual means includes an arm movable in the casing and coacting to move said slide, and a key insertable in the casing and connectible with said arm for moving the same.

4. In a parking meter of the class described, in combination, a casing, a signal movable thereon to signalling and non-signalling positions, mechanism in the casing for actuating said signal, including an actuator operable to move the signal to said positions, said signal actuating mechanism also comprising a locking member to hold the actuator in a position maintaining the signal in its signalling position, coin controlled manual means on the casing cooperating with the actuator to move the signal to non-signalling position and releasable upon operation of the coin controlled manual means when coacting with a coin in the meter to enable the signal to shift to non-signalling position, said actuator being provided with a coin supporting member to hold a coin previously controlling the operation of the first manual means for movement of the actuator by such means, subsequent movement of the actuator releasing such coin from said supporting member.

References Cited in the file of this patent

UNITED STATES PATENTS

| | | |
|---|---|---|
| 1,696,038 | James | Dec. 18, 1928 |
| 2,015,607 | Shinn | Sept. 24, 1935 |
| 2,038,963 | Seeburg | Apr. 28, 1936 |
| 2,147,520 | Bullock | Feb. 14, 1939 |
| 2,228,396 | Martin | Jan. 14, 1941 |
| 2,252,253 | Ferguson | Aug. 12, 1941 |
| 2,369,717 | Compton | Feb. 20, 1945 |
| 2,431,229 | Compton | Nov. 18, 1947 |
| 2,712,868 | Allen | July 12, 1955 |